US011434811B2

(12) United States Patent
Han et al.

(10) Patent No.: US 11,434,811 B2
(45) Date of Patent: Sep. 6, 2022

(54) COMBUSTION PRE-CHAMBER DEVICE FOR AN INTERNAL COMBUSTION ENGINE

(71) Applicant: Cummins Inc., Columbus, IN (US)

(72) Inventors: Xu Han, Columbus, IN (US); Xiao Qin, Columbus, IN (US); Alan C. Anderson, Columbus, IN (US); Nicholas James Welch, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/918,090

(22) Filed: Jul. 1, 2020

(65) Prior Publication Data

US 2020/0332705 A1 Oct. 22, 2020

Related U.S. Application Data

(63) Continuation of application No. PCT/US2019/012023, filed on Jan. 2, 2019.

(60) Provisional application No. 62/613,841, filed on Jan. 5, 2018.

(51) Int. Cl.
| | |
|---|---|
| *F02B 19/08* | (2006.01) |
| *F02B 19/02* | (2006.01) |
| *F02B 19/10* | (2006.01) |
| *F02P 13/00* | (2006.01) |

(52) U.S. Cl.
CPC .............. *F02B 19/08* (2013.01); *F02B 19/02* (2013.01); *F02B 19/1014* (2013.01); *F02P 13/00* (2013.01)

(58) Field of Classification Search
CPC ...... F02B 19/08; F02B 19/02; F02B 19/1014; F02B 19/12; F02B 19/16; F02P 13/00; Y02T 10/12; H01T 13/54
See application file for complete search history.

(56) References Cited

U.S. PATENT DOCUMENTS

| 4,221,195 A | 9/1980 | Hafele et al. |
| 4,416,228 A | 11/1983 | Benedikt et al. |
| 5,431,140 A | 7/1995 | Faulkner |

(Continued)

FOREIGN PATENT DOCUMENTS

| CN | 106948923 | * | 7/2017 |
| CN | 106948923 A | | 7/2017 |

(Continued)

OTHER PUBLICATIONS

International Search Report; International Searching Authority; International Application No. PCT/US2019/012023; dated Mar. 7, 2019; 2 pages.

(Continued)

*Primary Examiner* — Xiao En Mo
(74) *Attorney, Agent, or Firm* — Taft Stettinius & Hollister LLP (57) ABSTRACT

A combustion pre-chamber device for a spark ignition internal combustion engine is configured to engage a spark plug and be mounted to a cylinder head in communication with a combustion chamber of a cylinder of the engine. The combustion pre-chamber device includes any one or combination of a number of features to improve operating effectiveness, including extending the combustion operating range by improving cooling and optimizing the flow field inside the combustion pre-chamber device.

27 Claims, 5 Drawing Sheets

(56) References Cited

U.S. PATENT DOCUMENTS

| | | | |
|---|---|---|---|
| 5,533,476 A * | 7/1996 | Anderson | F02B 19/12 |
| | | | 123/267 |
| 6,441,528 B1 | 8/2002 | Uchida et al. | |
| 9,316,143 B2 | 4/2016 | Taliaferro | |
| 2003/0213461 A1* | 11/2003 | Regueiro | F02B 19/18 |
| | | | 123/262 |
| 2011/0146618 A1* | 6/2011 | LaPointe | F02B 19/12 |
| | | | 123/266 |
| 2012/0103302 A1 | 5/2012 | Attard | |
| 2012/0125279 A1* | 5/2012 | Hampson | F02P 15/10 |
| | | | 445/7 |
| 2013/0206122 A1* | 8/2013 | Chiera | F02P 15/001 |
| | | | 123/594 |
| 2016/0024995 A1* | 1/2016 | Trinkel | F02M 21/0275 |
| | | | 123/260 |
| 2016/0230646 A1 | 8/2016 | Kim | |
| 2016/0252007 A1 | 9/2016 | Ge et al. | |
| 2016/0254650 A1 | 9/2016 | Maul et al. | |
| 2017/0138251 A1 | 5/2017 | Watanabe et al. | |

FOREIGN PATENT DOCUMENTS

| | | |
|---|---|---|
| EP | 3051092 A1 | 8/2016 |
| EP | 3391484 A1 * | 6/2017 |
| WO | 2017062003 A1 | 4/2017 |
| WO | 2017102465 A1 | 6/2017 |

OTHER PUBLICATIONS

Written Opinion of the International Searching Authority; International Searching Authority; International Application No. PCT/US2019/012023; dated Mar. 7, 2019; 12 pages.

International Preliminary Report on Patentability; International Searching Authority; International Application No. PCT/US2019/012023; dated Jul. 16, 2020; 13 pages.

Supplementary European Search Report; European Patent Office; European Application No. 19735897.1; dated Aug. 2, 2021; 2 pages.

European Search Opinion; European Patent Office; European Application No. 19735897.1; dated Aug. 2, 2021; 2 pages.

Extended European Search Report; European Patent Office; European Application No. 19735897.1; dated Aug. 12, 2021; 1 page.

* cited by examiner

Fig. 1

(PRIOR ART)

COMBUSTION PRE-CHAMBER DEVICE FOR AN INTERNAL COMBUSTION ENGINE

CROSS-REFERENCE TO RELATED APPLICATION

The present application is a continuation of International Patent Application No. PCT/US2019/012023 filed on Jan. 2, 2019, and claims the benefit of the filing date of U.S. Provisional Application No. 62/613,841 filed on Jan. 5, 2018, which are incorporated herein by reference.

TECHNICAL FIELD

The present application relates to internal combustion engines, and more particularly, but not exclusively relates to a combustion pre-chamber device for spark ignition engines.

BACKGROUND

Figure 1:
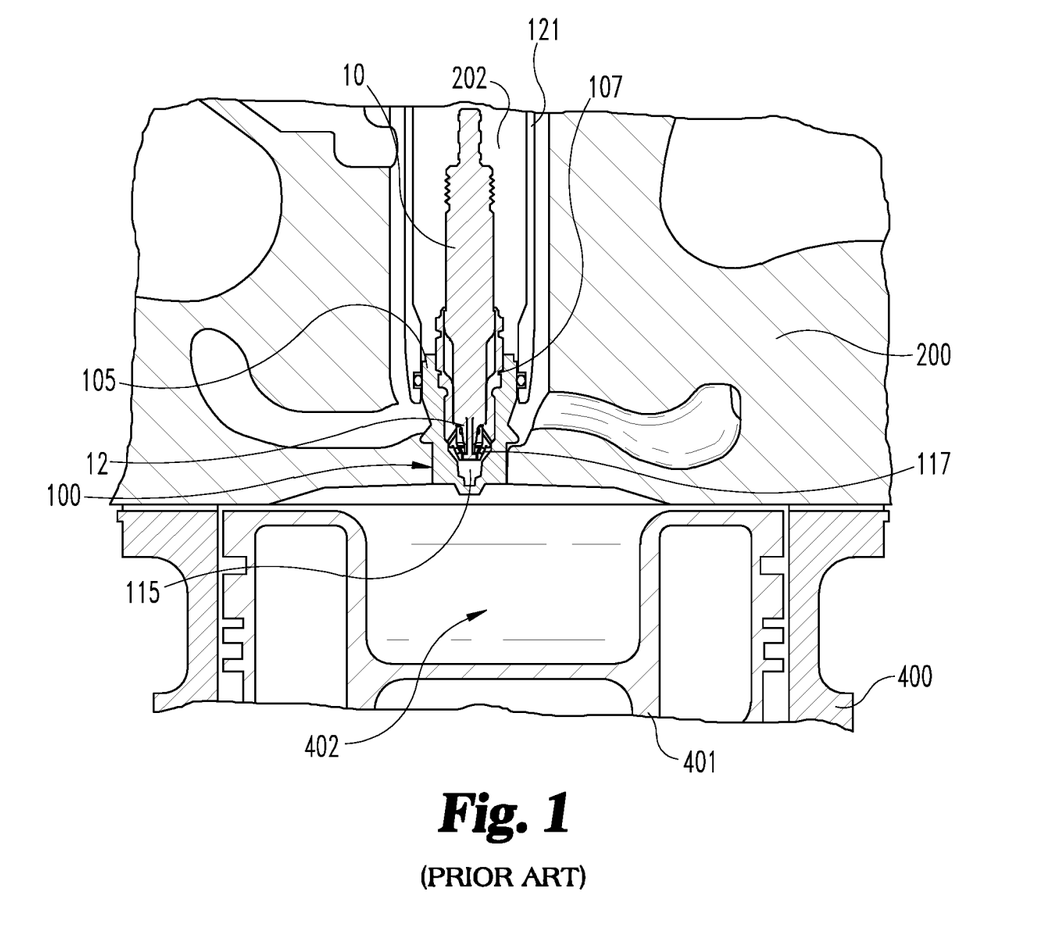
FIG. 1 is a cross-sectional side view of a typical pre-chamber assembly installed in a cylinder head.

It is well documented that the use of combustion pre-chamber devices with spark plugs, such as shown in FIG. 1, in pre-chamber assemblies in a spark ignited, natural gas fueled, engine can result in an extended lambda (air/fuel ratio) range as compared to conventional main chamber ignition. Generally this allows the engine to be operated leaner than an open chamber system, resulting in lower NOx emissions while maintaining good cycle-to-cycle peak cylinder pressure variation. With these engines there is usually an operational trade-off between NOx emissions and fuel consumption. For applications that have higher NOx emission limits than others, better fuel consumption can be obtained by running the pre-chamber engine slightly less lean (i.e., at a lower lambda value). Depending on the cost of fuel, this operation at a lower lambda value can offer substantial savings to the engine owner/operator.

Spark plugs are used in conjunction with various types of combustion chamber configurations to initiate a flame in a flammable fuel and air mixture. Some combustion chamber configurations include passive pre-chamber, open chamber, and fuel fed pre-chamber configurations. Pre-chambers are useful for initiating and propagating the combustion flame for pre-mixed gaseous-fueled engines. In particular, pre-chambers provide benefits as applied in lean-burn natural gas engines which can be difficult to ignite using conventional open chamber type configurations.

Passive pre-chambers include a combustion volume in which the spark plug is located. The combustion volume of the pre-chamber is linked to the main combustion chamber of the cylinder by the use of orifices or nozzles. The spark plugs include a central cathode electrode and one or more outer ground or anode electrodes, which at least partially surround the cathode electrode to create a gap therebetween. The spark plug initiates a combustion event by generating a spark (e.g., an electron current) that spans the gap between the central cathode electrode and one or more outer ground electrodes. More specifically, the spark initiates a flame that propagates through the pre-chamber volume. This combustion creates a sudden increase in pressure in the pre-chamber creating a large pressure difference across the orifices between the pre-chamber and main chamber. The pressure difference forces the flame to propel through the orifices into the main combustion chamber resulting in a successful combustion event.

After a successful combustion event, the residual exhaust gases in the main chamber are scavenged during the exhaust stroke of the piston within the cylinder. During the intake stroke, a fresh, pre-mixed air and fuel mixture (charge) is pulled into the main cylinder via an expansion event driven by the piston.

Currently available combustion pre-chamber devices suffer from issues relating to misfire events and lowered durability of ignition systems due to the high temperatures within the combustion pre-chamber devices. In addition, the combustion operating range, as characterized by knock tendency (measured in methane number) and air-fuel ratio (measured in lambda), at which the pre-chamber device operates effectively can be limited due to the flow field inside the combustion pre-chamber device and inadequate cooling of the combustion pre-chamber device. Accordingly, there is a continuing demand for further contributions in this area of technology.

SUMMARY

One embodiment of the present application is a combustion pre-chamber device for a spark ignition internal combustion engine. The pre-chamber device includes an improved shape and other characteristics that provide improved cooling and flow through the combustion pre-chamber of the combustion pre-chamber device. In the descriptions that follow, a passive combustion pre-chamber is described, but the present disclosure is not limited to such and includes charge fed and fuel fed combustion pre-chamber devices.

Other embodiments include unique methods, systems, devices, and apparatus involving or relating to spark ignition engine modifications and/or emissions control. Certain embodiments related to a lean burn, gaseous fueled, internal combustion engine. Further objects, forms, embodiments, benefits, advantages, features, and aspects of the present application shall become apparent from the description and drawings contained herein.

BRIEF DESCRIPTION OF THE FIGURES

In order that the advantages of the subject matter may be more readily understood, a more particular description of the subject matter briefly described above will be rendered by reference to certain embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

For the purposes of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

FIG. 1 shows a cross-sectional side view of an example prior art passive pre-chamber assembly mounted directly to the cylinder head 200 of an internal combustion engine. The cylinder head 200 of conventional internal combustion engines includes a plurality of spark plug recesses 202 (only one shown) each for receiving a respective spark plug 10. Typically, the conventional spark plug is fitted within a respective recess 202 with an O-ring adapter 121 such that all or part of the cathode and anode electrodes of the conventional spark plug are positioned within (e.g., directly exposed to) a respective main combustion chamber 402 of the engine or cylinder block when the cylinder head 200 is mounted to the cylinder liner 400 that is supported in the engine block. The recess 202 is fluidly coupled to an air-fuel mixture inlet for receiving an air-fuel mixture from air intake and fuel sources (not shown).

Figure 2:
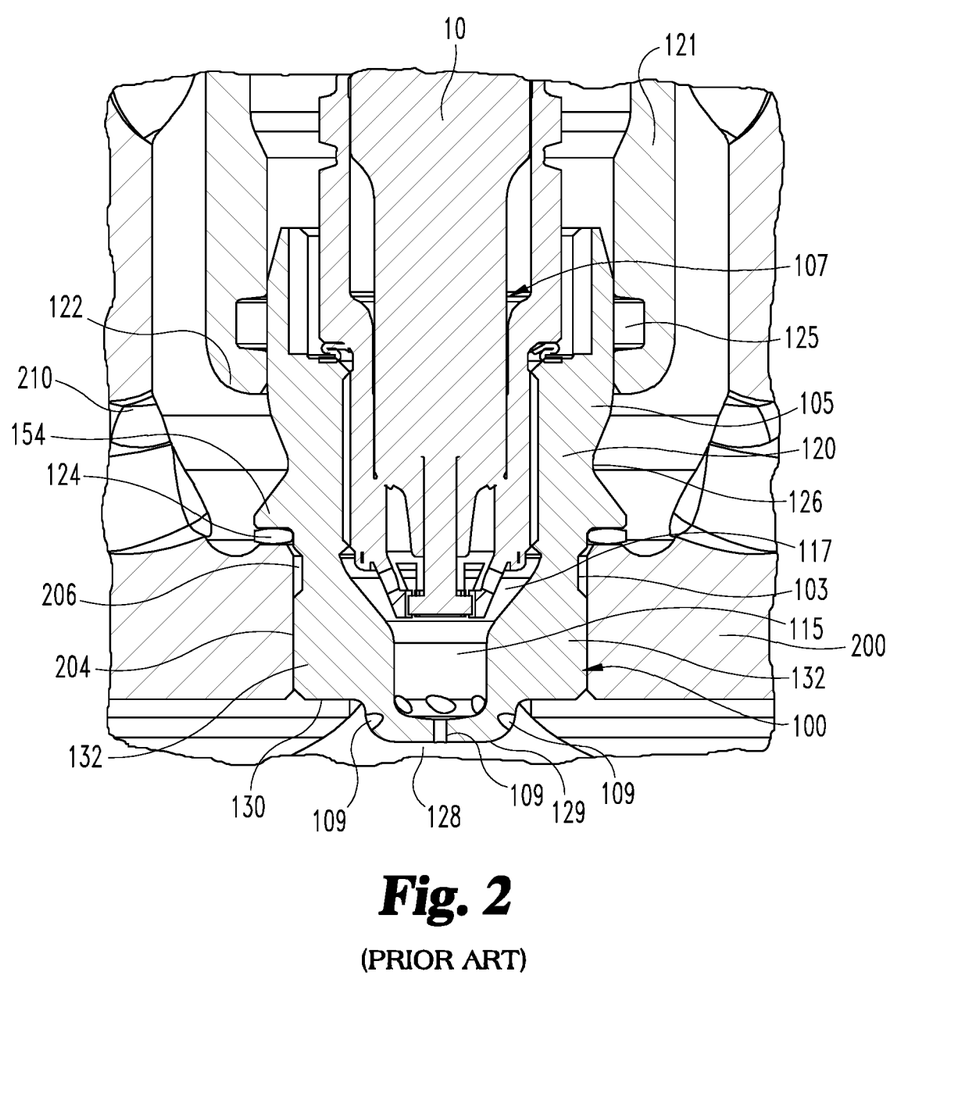
FIG. 2 is a cross-sectional side view of a typical combustion pre-chamber device and spark plug of the pre-chamber assembly of FIG. 1.

As shown further in FIG. 2, a conventional spark plug may be connected with a passive pre-chamber device 100, which is fitted within the spark plug recess 202. The pre-chamber device 100 includes a body 105 that defines a pre-chamber volume 115. The pre-chamber volume 115 effectively spatially separates the spark plug (e.g., spark plug 10) from the main combustion chamber 402. The body 105 includes one or more orifices or nozzles 109 in its distal end wall that fluidly connect the pre-chamber volume 115 with the main combustion chamber 402. As discussed above, the pre-chamber volume 115 facilitates the initiation and propagation of a combustion flame for the internal combustion engine. The body 105 may include connectors (e.g., external threads) matching or similar in dimensions the connectors (e.g., external threads) that are found on conventional spark plugs. The connectors of the body 105 mate with corresponding connectors (e.g., internal threads) formed within the O-ring adapter 121 in the spark plug recess 202 to secure the pre-chamber device 100 to the O-ring adapter 121. Threads on sidewall 204 of cylinder head 200 connect the pre-chamber device 100 to cylinder head 200. An O-ring 125 is provided between the O-ring adapter 121 and body 105 to seal the coolant passage. The body 105 includes a proximally opening (away from combustion chamber 402) receptacle 107 configured to receive and retain the spark plug 10 within the body 105 such that the cathode and anode electrodes of the spark plug 10 are positioned within the pre-chamber volume 115.

The body 105 includes pre-chamber inlet apertures 109 for receiving the air-fuel mixture from the inlet of the cylinder head 200 into the pre-chamber volume 115. The inlet apertures 109 are located in a distal end wall 128 that is formed by the end wall of a cylindrical nose 129 that is surrounded by a planar end wall 130 that extends around distal end wall 128. The planar end wall 130 does not include apertures, and planar end wall 130 extends between the threaded sidewall 204 of the opening 206 in cylinder head 200 and the cylindrical nose of body 105. A threaded cylindrical body portion 132 extends proximally from planar end wall 130 and axially engages a portion of the length of sidewall 204 along opening 206 to provide a sealing threaded engagement with cylinder head 200 along sidewall 204. Body portion 132 includes an outer circumferential groove 103 that does not contact sidewall 204.

The pre-chamber volume 115 is in fluid communication with a gap 117 which is in the form of an annular space between the exterior surface of the spark plug 10 and the inner surface of the pre-chamber volume 115, the gap 117 being positioned toward a proximal portion of an electrode end portion of the spark plug 10. The gap 117 defines a portion of the pre-chamber volume 115 that receives the spark plug electrodes. Body 105 also includes a neck portion 120 between seal 124 and the distal end of O-ring adapter 121. Neck portion 120 is formed by an outer wall surface that is tapered proximally and distally (toward the combustion chamber 402) to a mid-region 126 in order to form a minimum diameter of neck portion 120 between seal 124 and the distal end 122 of O-ring adapter 121. The wall thickness of neck portion 120 varies along the length of the engagement of the spark plug 10 within the pre-chamber volume 115 between a flange 154 and distal end 122.

In operation, the pre-chamber device 100 forms a small ante-chamber in the form of pre-chamber volume 115 that is typically less than 1% of the clearance volume of the main combustion chamber 402. Combustion is initiated in the pre-chamber volume 115 rather than in the main combustion chamber 402 due to the generally lower turbulence level at the time of ignition in the pre-chamber volume 115, thereby allowing for more consistent initial flame kernel growth. In some cases, either fresh charge or supplemental fuel is added to the pre-chamber volume 115 in order to operate at very lean mixtures in the main chamber 402. The products of combustion from the pre-chamber volume 115 then pass through the nozzles 109 to the main combustion chamber 402 where they act as a high energy ignition system for the lean main combustion charge.

Figure 3:
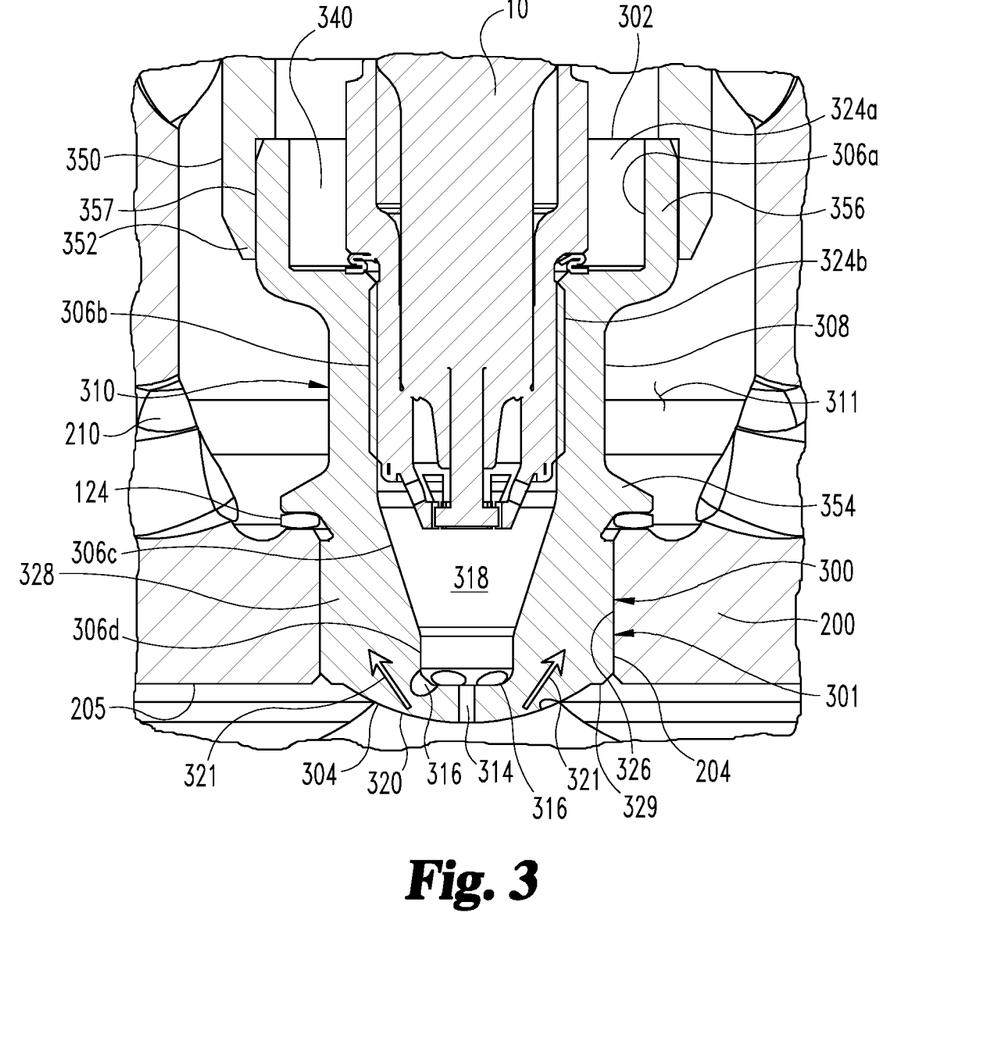
FIG. 3 is a cross-sectional side view of a new combustion pre-chamber device installed in a cylinder head and engaged with a spark plug.

Referring to FIG. 3, a new combustion pre-chamber device 300 is illustrated in engagement with cylinder head 200 and a spark plug 10. Combustion pre-chamber device 300 provides improved cooling and flow fields as compared to combustion pre-chamber device 100. The combustion pre-chamber device 300 includes a body 301 that extends from a first (proximal) end 302 to a second (distal) end 304. In certain embodiments, the first end 302 and the second end 304 are formed as a single unit to provide an integral body 301. The combustion pre-chamber device 300 further includes an inner surface including a first inner surface portion 306a that defines a proximal chamber 340 within a proximal cylindrical body portion 356, a second inner surface portion 306b that includes threads or other structure to engage spark plug 10, a third inner surface portion 306c that defines a distally tapered part of the combustion pre-chamber 318, and a fourth inner surface portion 306d that defines a distal cylindrical part of the combustion pre-chamber 318.

Body 301 also includes an outer surface portion 308 that forms a linear, axially extending neck portion 310 between flange 354 of body 301 and the distal end 352 of a modified adapter 350. Neck portion 310 is formed by a wall surface that is axial and non-tapered between the flange 354, which engages the seal 124, and the proximal cylindrical body portion 356 that is engaged to the adapter 350. The neck portion 310 has a constant thickness along the second inner surface portion 306b that is engaged to spark plug 10. Neck portion 310 also is in fluid communication with the cooling channel 210 of cylinder head 200. The neck portion 310 improves heat transfer from the spark plug 10 and the combustion pre-chamber 318 to the coolant in cooling channel 210. In certain embodiments, the neck portion 310 defines a cooling channel 311 about the outer surface 308 of combustion pre-chamber device 300. The cooling channel 311 is fluidly coupled to the head cooling channel 210 in cylinder head 200 to define a cooling jacket around the body 301 of combustion pre-chamber device 300.

The proximal cylindrical body portion 356 that is engaged to the adapter 350 can be configured to provide a permanent assembly of the adapter 350 and the combustion pre-chamber device 300. The adapter 350 includes an inner groove 357 around distal end 352 that receives and engages the proximal cylindrical body portion 356. The engagement can be by threads, friction or interference fit, unitary construction, weld or other fastener or fastening technique. This permanent engagement can eliminate the O-ring 125 and provide more contact area for the same length of overlap between the components. The permanent engagement can also provide better heat transfer between the combustion pre-chamber device 300 and the adapter 350, with the adapter 350 acting as a heat sink to help cool the combustion pre-chamber device 300.

The first end 302 of body 301 defines a first inner spark plug passage portion 324a along the first inner surface 306a and a second inner spark plug passage portion 324b along second inner surface 306b. The second inner spark plug passage portion 324b defines threads that receive complementary spark plug threads defined by spark plug 10. The second end 304 of body 301 opposite the first end 302 includes second end threads 326 along the outer surface of a distal cylindrical body portion 328. Threads 326 couple to complementary threads along the length of sidewall 204 that forms the opening 206 so that distal cylindrical body portion 328 provides a threaded engagement with cylinder head 200 and compress seal 124. In certain embodiments, the entire axial length of the outer surface of the distal cylindrical body portion 328 is in contact with the sidewall 204 defining opening 206 of cylinder head 200. The length of contact extends from seal 124 to the distal end wall 205 of cylinder head 200 that faces the combustion chamber 402. In contrast, the combustion pre-chamber device 100 in FIG. 2 includes a groove 103 in the outer surface thereof located along sidewall 204 that prevents contact along the entire length of the sidewall 204 with combustion pre-chamber device 100. In FIG. 3, the maximum length of contact between the distal cylindrical body portion 328 of the combustion pre-chamber device 300 and the cylinder head 200 along the entire length of sidewall 204 provides a greater surface area of contact for improved heat transfer and cooling of the combustion pre-chamber 318.

The second end 304 of body 301 includes a distal tip that is substantially enclosed with a dome shaped distal end wall 320 that includes a fluid connection with the combustion pre-chamber 318. Distal end wall 320 includes a plurality of nozzles 314, 316 that form through-holes for fluid communication with the combustion chamber 402. The combustion pre-chamber 318 is configured to fluidly communicate with an electrode of the spark plug 10 when the spark plug 10 is received at the first end 302. In certain embodiments, the spark plug 10 includes multiple ignition sites, or electrodes, that are in fluid communication with combustion pre-chamber 318.

While the combustion pre-chamber device 300 is coupled to the cylinder head 200, the second end 304 extends into the combustion chamber 402. The distal end wall 320 of second end 304 is located in the cylinder combustion chamber 402 sufficiently such that the nozzles 314, 316 communicate with the cylinder combustion chamber 402 to receive the charge air and fuel without interfering with the piston 401. The distal end wall 320 is dome-shaped, rather than the planar end wall 128 of device 100. The dome-shaped distal end wall 320 provides a convex curvature facing combustion chamber 402 that extends to and is surrounded by a planar end wall 329. The planar end wall 329 does not include apertures, and planar end wall 329 extends between the sidewall 204 of the opening 206 in cylinder head 200 and the dome-shaped end wall 320. The planar end wall 329 is significantly smaller than planar end wall 130 of device 100. The dome-shaped end wall 320 occupies a substantial portion of the second end 304 facing the combustion chamber 402. The substantial portion occupied by distal end wall 320 can include, for example, extending across more than 60% of the diameter of opening 206, extending across more than 75% of the diameter of the opening 206, or extending across more than 90% of the diameter of opening 206. In contrast, the distal end wall 128 of combustion pre-chamber device 100 extends across about 50% of the diameter of opening 206, and does not include a dome-shape but rather a cylindrical shape or completely flat. The dome shape of distal end wall 320 provides an increased heat flow path to the coolant as indicated by the arrows 321.

The electrodes of spark plug 10 are located at the proximal end of the tapered part of the combustion pre-chamber 318 that is defined by third inner surface portion 306c, which spaces the electrodes proximally from the cylindrical part of the combustion pre-chamber 318 defined by fourth inner surface portion 306d. In contrast, the combustion pre-chamber device 100 is arranged so the electrodes of the spark plug 10 are located at or near the cylindrical portion of the combustion pre-chamber 115. The modified arrangement provided by combustion pre-chamber device 300 maximizes heat transfer from the spark plug 10 to the coolant, which keeps the spark plug and pre-chamber device 300 cooler than device 100.

Figure 4:
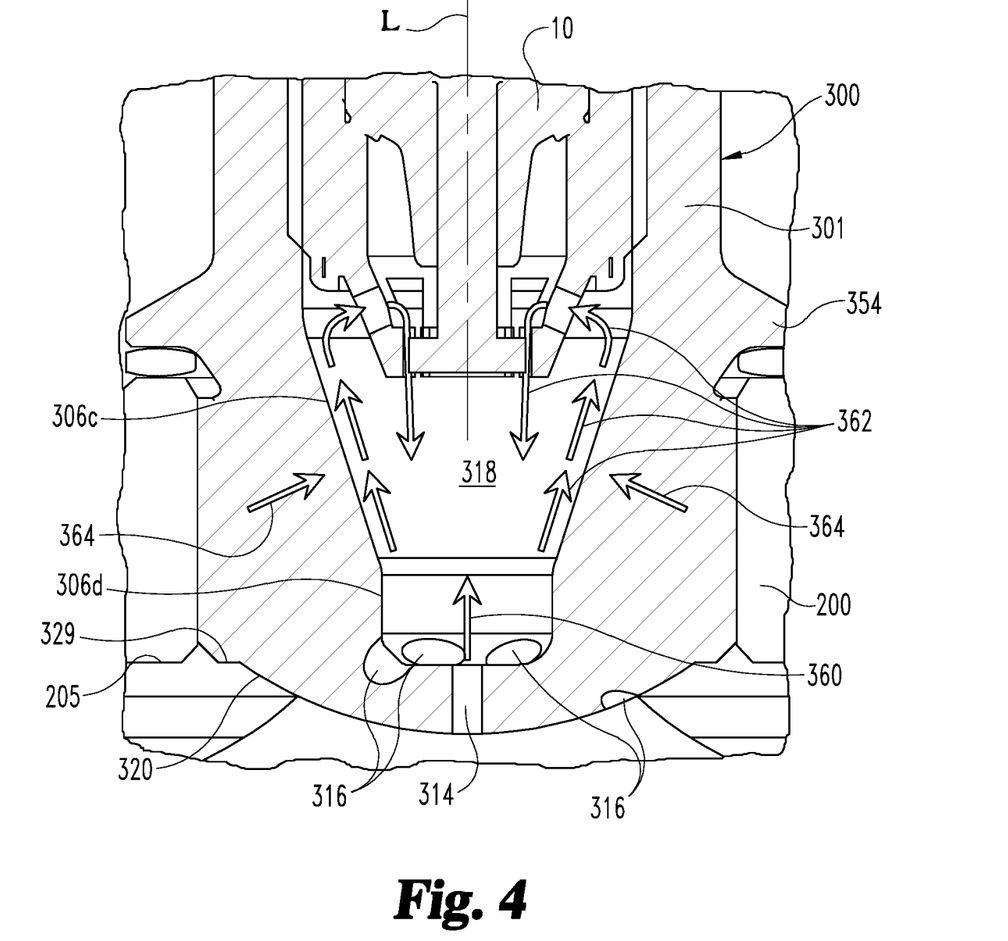
FIG. 4 is another cross-sectional side view of the new combustion pre-chamber device of FIG. 3 showing an improved flow field within the combustion pre-chamber volume.

In certain embodiments, the second end 304 includes a plurality of swirl nozzles 316 that are positioned through distal end wall 320 at the second end 304, and at least one axial nozzle 314. The swirl nozzles 316 includes a swirl component and an axial component, with the swirl component being greater than the axial component, depending on the angles of the oblique orientation of the nozzle 316 relative to longitudinal axis L (FIG. 4.) The axial nozzle(s) 314 may include a very small or no swirl component, and a relatively larger axial component. The nozzles 314, 316 provide fluid coupling between the combustion pre-chamber 318 and the cylinder combustion chamber 402. The axial nozzle 314 may be at the center of the distal end wall 320 or near the center of the distal end wall 320. In certain embodiments, the spark plug 10 and the combustion pre-chamber device 300 may share a common central longitudinal axis L, as shown in FIG. 4. The axial nozzle(s) 314 may be aligned with the central longitudinal axis L, or offset from but parallel or generally parallel to longitudinal axis L. The swirl nozzles 316 may be aligned at an angle oblique to the central longitudinal axis L and positioned around the axial nozzle(s) 314.

The axial nozzle 314 is oriented directly at the spark plug 10 to provide cooling during the compression stroke, as indicated by arrow 360. The axial nozzle 314 also controls the velocity of the charge at the spark gap at the time of ignition. The swirl nozzles 316 provide a swirl direction for the charge flow that is the same as the swirl direction in the main combustion chamber 402 when the flame front is exiting the pre-chamber volume 318. The tapered inner surface portion 306c aids in the swirl flow during the compression stroke due to the transition from the smaller diameter to the larger proximal diameter, as indicated by arrows 364, around the spark plug electrode. The spark plug ground electrode design complements the swirl flow to achieve the proper flow direction and velocity at the electrode gap at the time of ignition, as indicated by arrows 362.

Figure 5:
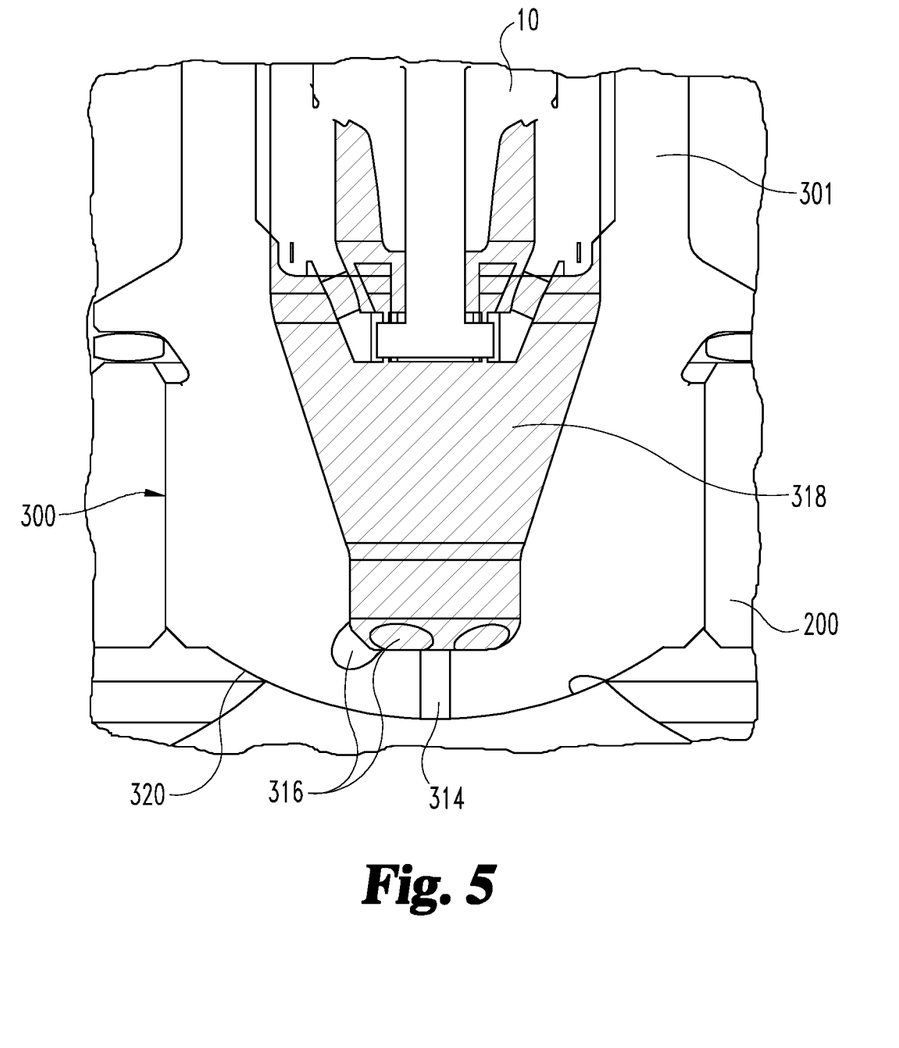
FIG. 5 is another cross-sectional side view of the new combustion pre-chamber device of FIG. 3 showing an improved pre-chamber volume to nozzle area ratio.

Referring now to FIG. 5, combustion pre-chamber device 300 is shown with pre-chamber volume 318 hatched. The inventors have discovered that a ratio of the pre-chamber volume to nozzle area (the sum of the cross-sectional areas of the nozzles 314, 316) of 130 mm to 150 mm provides a desired pre-chamber mixing, jet velocity, and charge velocity at the spark gap at the time of ignition. Furthermore, the nozzles 314, 316 have an axial component and a swirl component. A swirl to axial ratio of between 1.55 and 1.85 for the swirl components to the axial components of the nozzles 314, 316 has been found to impart the desire swirl and axial flow characteristics for the charge flow in pre-chamber volume 318.

As is evident from the figures and text presented above, a variety of embodiments according to the present invention are contemplated. According to one aspect, an apparatus includes a combustion pre-chamber device for engaging a cylinder head of an internal combustion engine. The combustion pre-chamber device includes a body with an outer surface extending between a first proximal end and an opposite second distal end of the body. The first end of the body includes an opening to an inner passage defined by the body for receiving a spark plug. The body defines a combustion pre-chamber distally of the spark plug and at least one nozzle in communication with the combustion pre-chamber that opens through distal end wall of the body.

Any one or combination of the following described embodiments may be provided with the apparatus described above. In one embodiment, a dome-shaped distal end wall at the second end of the body extends across a substantial portion of an opening in the cylinder head to which the combustion pre-chamber device is engaged.

In another embodiment, the dome-shaped distal end wall extends at least partially into a combustion chamber of a cylinder of the internal combustion engine with the body engaged to the cylinder head. The at least one nozzle includes at least one axial nozzle that extends along a longitudinal axis of the body and at least one swirl nozzle that is obliquely oriented to the longitudinal axis. In a further embodiment, a ratio of a swirl flow component to an axial flow component of the swirl and axial nozzles ranges from 1.55 to 1.85. In a further embodiment, a ratio of a volume of the combustion pre-chamber to a cross-sectional area of the least one axial nozzle and the at least one swirl nozzle ranges from 130 mm to 150 mm. In a further embodiment, the dome-shaped distal end wall extends at least partially into a combustion chamber of a cylinder of the internal combustion engine with the body engaged to the cylinder head, wherein the at least one nozzle includes a first swirl nozzle that extends along a longitudinal axis of the body and a second swirl nozzle that is obliquely oriented to the longitudinal axis. In one refinement of this embodiment, a ratio of a volume of the combustion pre-chamber to a cross-sectional area of the first swirl nozzle and the second swirl nozzle ranges from 130 mm to 150 mm. In a further refinement, the dome-shaped distal end wall is entirely convexly curved toward the combustion chamber and each of the at least one axial nozzle and the at least one swirl nozzle extend through the convexly curved dome-shaped distal end wall.

In another embodiment, the combustion pre-chamber includes a volume with a distal cylindrical portion that extends proximally from the dome-shaped distal end wall and a tapered portion that widens proximally and extends from the distal cylindrical portion toward the spark plug. In a refinement, electrodes of the spark plug are located at a proximal end of the tapered portion of the volume of the combustion pre-chamber.

In another embodiment, the outer surface of the body of the combustion pre-chamber device includes a cylindrical portion extending proximally from the dome-shaped distal end wall that engages the opening of the cylinder head. The body of the combustion pre-chamber device further includes a flange at a proximal end of the cylindrical portion. The opening of the cylinder head includes a length from a distal wall facing the combustion chamber to a seal that is engaged by the flange of the combustion pre-chamber device. The cylindrical portion of the combustion pre-chamber device is in contact with substantially the entire length of the opening of the cylinder head between the seal and the distal wall. In a refinement, the cylindrical portion of the combustion pre-chamber device is in contact with the entire length of the opening of the cylinder head between the seal and the distal wall.

In another embodiment, the outer surface of the body of the combustion pre-chamber device defines a cylindrical neck extending along the engagement of the spark plug with the inner passage of the body. The cylindrical neck is in communication with a coolant passage of the cylinder head and includes a constant thickness along a part of the inner passage that is engaged to the spark plug. In a refinement, the cylindrical neck defines a cooling channel around the body of the combustion pre-chamber device.

In another embodiment, an elongated adapter is provided for positioning in the cylinder head. The adapter includes a bore for receiving the spark plug. The adapter includes a distal end portion that is fixedly engaged to a proximal end portion of the body of the combustion pre-chamber device without an O-ring between the adapter and the combustion pre-chamber device. In a refinement, wherein one of the distal end portion of the adapter and the proximal end portion of the body of the combustion pre-chamber device includes a circumferential groove for receiving the other of the distal end portion of the adapter and the proximal end portion of the body of the combustion pre-chamber device.

According to one aspect, an apparatus includes a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and including an axial nozzle that extends along a longitudinal axis of the body and a swirl nozzle that is obliquely oriented to the longitudinal axis, wherein the axial and the swirl nozzles are in communication with the combustion pre-chamber that opens through a dome-shaped distal end wall at the second end of the body.

In one embodiment, the dome-shaped distal end wall extends at least partially into a combustion chamber of a cylinder of the internal combustion engine with the body engaged to the cylinder head, the dome-shaped distal end wall extending across a substantial portion of an opening in the cylinder head to which the combustion pre-chamber device is engaged.

In another embodiment, a ratio of a swirl flow component to an axial flow component of the swirl and axial nozzles ranges from 1.55 to 1.85.

In another embodiment, a ratio of a volume of the combustion pre-chamber to a cross-sectional area of the axial nozzle and the swirl nozzle ranges from 130 mm to 150 mm.

In another embodiment, the dome-shaped distal end wall is entirely convexly curved toward the combustion chamber, and the axial nozzle and the swirl nozzle extend through the convexly curved dome-shaped distal end wall.

According to another aspect, an apparatus includes a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, wherein the combustion pre-chamber includes a volume with a distal cylindrical portion that extends proximally from the dome-shaped distal end wall and a tapered portion that widens proximally and extends from the distal cylindrical portion toward the spark plug.

In one embodiment, electrodes of the spark plug are located at a proximal end of the tapered portion of the volume of the combustion pre-chamber.

According to yet another aspect, an apparatus includes a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, wherein the outer surface of the body of the combustion pre-chamber device includes a cylindrical portion extending proximally from the dome-shaped distal end wall that engages the opening of the cylinder head, the body of the combustion pre-chamber device further including a flange at a proximal end of the cylindrical portion, wherein the opening of the cylinder head includes a length from a distal wall facing the combustion chamber to a seal that is engaged by the flange of the combustion pre-chamber device, wherein the cylindrical portion of the combustion pre-chamber device is in contact with substantially the entire length of the opening of the cylinder head between the seal and the distal wall.

In one embodiment, the cylindrical portion of the combustion pre-chamber device is in contact with the maximum length of the opening of the cylinder head between the seal and the distal wall.

According to another aspect, an apparatus includes a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, wherein the outer surface of the body of the combustion pre-chamber device defines a cylindrical neck extending along the engagement of the spark plug with the inner passage of the body, wherein the cylindrical neck is in communication with a coolant passage of the cylinder head and includes a constant thickness along a part of the inner passage that is engaged to the spark plug.

In one embodiment, the cylindrical neck defines a cooling channel around the body of the combustion pre-chamber device.

According to yet another aspect, an apparatus includes a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, and an elongated adapter at least partly located in the cylinder head, wherein the adapter includes a bore for receiving the spark plug, the adapter including a distal end portion that is fixedly engaged to a proximal end portion of the body of the combustion pre-chamber device without an O-ring between the adapter and the combustion pre-chamber device.

In one embodiment, one of the distal end portion of the adapter and the proximal end portion of the body of the combustion pre-chamber device includes a circumferential groove for receiving the other of the distal end portion of the adapter and the proximal end portion of the body of the combustion pre-chamber device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, the dome-shaped distal end wall is convexly curved towards an opening in the cylinder head to which the combustion pre-chamber device is engaged, wherein the dome-shaped distal end wall includes a first curved portion that extends into a combustion chamber of a cylinder of the internal combustion engine with the body engaged to the cylinder head, wherein the dome-shaped distal end wall includes a second curved portion that extends from the first curved portion above the combustion chamber.

2. The apparatus of claim 1, wherein the at least one nozzle includes at least one axial nozzle that extends along a longitudinal axis of the body and at least one swirl nozzle that is obliquely oriented to the longitudinal axis.

3. The apparatus of claim 2, wherein a ratio of a swirl flow component to an axial flow component of the swirl and axial nozzles ranges from 1.55 to 1.85.

4. The apparatus of claim 2, wherein a ratio of a volume of the combustion pre-chamber to a cross-sectional area of the least one axial nozzle and the at least one swirl nozzle ranges from 130 mm to 150 mm.

5. The apparatus of claim 1, wherein the at least one nozzle includes a first swirl nozzle that extends along a longitudinal axis of the body and a second swirl nozzle that is obliquely oriented to the longitudinal axis.

6. The apparatus of claim 5, wherein a ratio of a volume of the combustion pre-chamber to a cross-sectional area of the first swirl nozzle and the second swirl nozzle ranges from 130 mm to 150 mm.

7. The apparatus of claim 2, wherein each of the at least one axial nozzle and the at least one swirl nozzle extend through the convexly curved dome-shaped distal end wall.

8. The apparatus of claim 1, wherein the combustion pre-chamber includes a volume with a distal cylindrical portion that extends proximally from the dome-shaped distal end wall and a tapered portion that widens proximally and extends from the distal cylindrical portion toward the spark plug.

9. The apparatus of claim 8, wherein electrodes of the spark plug are located at a proximal end of the tapered portion of the volume of the combustion pre-chamber.

10. The apparatus of claim 1, wherein the outer surface of the body of the combustion pre-chamber device includes a cylindrical portion extending proximally from the dome-shaped distal end wall that engages the opening of the cylinder head, the body of the combustion pre-chamber device further including a flange at a proximal end of the cylindrical portion, wherein the opening of the cylinder head includes a length from a distal wall facing the combustion chamber to a seal that is engaged by the flange of the combustion pre-chamber device, wherein the cylindrical portion of the combustion pre-chamber device is in contact with the entire length of the opening of the cylinder head between the seal and the distal wall.

11. The apparatus of claim 10, wherein the cylindrical portion of the combustion pre-chamber device is in contact with the maximum length of the opening of the cylinder head between the seal and the distal wall.

12. The apparatus of claim 1, wherein the outer surface of the body of the combustion pre-chamber device defines a cylindrical neck extending along the engagement of the spark plug with the inner passage of the body, wherein the cylindrical neck is in communication with a coolant passage of the cylinder head and includes a constant thickness along a part of the inner passage that is engaged to the spark plug.

13. The apparatus of claim 12, wherein the cylindrical neck defines a cooling channel around the body of the combustion pre-chamber device.

14. The apparatus of claim 1, further comprising an elongated adapter for positioning in the cylinder head, wherein the adapter includes a bore for receiving the spark plug, wherein the distal end portion of the adapter is fixedly engaged to the proximal end portion of the body of the combustion pre-chamber device without an O-ring between the adapter and the combustion pre-chamber device.

15. The apparatus of claim 14, wherein one of the distal end portion of the adapter and the proximal end portion of the body of the combustion pre-chamber device includes a circumferential groove for receiving the other of the distal end portion of the adapter and the proximal end portion of the body of the combustion pre-chamber device.

16. An apparatus, comprising:
a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and including an axial nozzle that extends along a longitudinal axis of the body and a swirl nozzle that is obliquely oriented to the longitudinal axis, wherein the axial and the swirl nozzles are in communication with the combustion pre-chamber that opens through a dome-shaped distal end wall at the second end of the body, wherein the dome-shaped distal end wall is convexly curved towards and extends across an opening in the cylinder head to which the combustion chamber pre-chamber device is engaged, wherein the dome-shaped distal end wall includes a first curved portion that extends into a combustion chamber of a cylinder of the internal combustion engine with the body engaged to the cylinder head, wherein the dome-shaped distal end wall includes a second curved portion that extends from the first curved portion above the combustion chamber.

17. The apparatus of claim 16, wherein a ratio of a swirl flow component to an axial flow component of the swirl and axial nozzles ranges from 1.55 to 1.85.

18. The apparatus of claim 16, wherein a ratio of a volume of the combustion pre-chamber to a cross-sectional area of the axial nozzle and the swirl nozzle ranges from 130 mm to 150 mm.

19. The apparatus of claim 16, wherein the axial nozzle and the swirl nozzle extend through the convexly curved dome-shaped distal end wall.

20. An apparatus, comprising:
a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, wherein the combustion pre-chamber includes a volume with a distal cylindrical portion that extends proximally from the dome-shaped distal end wall and a tapered portion that widens proximally and extends from the distal cylindrical portion toward the spark plug, wherein the dome-shaped distal end wall is convexly curved to extend across an opening in the cylinder head to which the combustion chamber pre-chamber device is engaged, wherein the dome-shaped distal end wall includes a first curved portion that extends into a combustion chamber of a cylinder of the internal combustion engine with the body engaged to the cylinder head, wherein the dome-shaped distal end wall includes a second curved portion that extends from the first curved portion above the combustion chamber.

21. The apparatus of claim 20, wherein electrodes of the spark plug are located at a proximal end of the tapered portion of the volume of the combustion pre-chamber.

22. An apparatus, comprising:
a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, wherein the outer surface of the body of the combustion pre-chamber device includes a cylindrical portion extending proximally from the dome-shaped distal end wall that engages the opening of the cylinder head, the body of the combustion pre-chamber device further including a flange at a proximal end of the cylindrical portion, wherein the opening of the cylinder head includes a length from a distal wall facing the combustion chamber to a seal that is engaged by the flange of the combustion pre-chamber device, wherein the cylindrical portion of the combustion pre-chamber device is in contact with substantially the entire length of the opening of the cylinder head between the seal and the distal wall, and
wherein the dome-shaped distal end wall is convexly curved to extend across an opening in the cylinder head to which the combustion chamber pre-chamber device is engaged, wherein the dome-shaped distal end wall includes a first curved portion that extends into a combustion chamber of a cylinder of the internal combustion engine with the body engaged to the cylinder head, wherein the dome-shaped distal end wall includes a second curved portion that extends from the first curved portion above the combustion chamber.

23. The apparatus of claim 22, wherein the cylindrical portion of the combustion pre-chamber device is in contact with the entire length of the opening of the cylinder head between the seal and the distal wall.

24. An apparatus, comprising:
a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, wherein the dome-shaped distal end wall is convexly curved to extend across an opening in the cylinder head to which the combustion chamber pre-chamber device is engaged, wherein the dome-shaped distal end wall includes a first curved portion that extends into a combustion chamber of a cylinder of the internal combustion engine with the body engaged to the cylinder head, wherein the dome-shaped distal end wall includes a second curved portion that extends from the first curved portion above the combustion chamber, wherein the outer surface of the body of the combustion pre-chamber device defines a cylindrical neck extending along the engagement of the spark plug with the inner passage of the body, wherein the cylindrical neck is in communication with a coolant passage of the cylinder head and includes a constant thickness along a part of the inner passage that is engaged to the spark plug.

25. The apparatus of claim 24, wherein the cylindrical neck defines a cooling channel around the body of the combustion pre-chamber device.

26. An apparatus, comprising:
a combustion pre-chamber device for engaging a cylinder head of an internal combustion engine, the combustion pre-chamber device including a body with an outer surface extending between a first proximal end and an opposite second distal end of the body, the first end of the body including an opening to an inner passage defined by the body for receiving a spark plug, the body defining a combustion pre-chamber distally of the spark plug and at least one nozzle in communication with the combustion pre-chamber that opens through a dome-shaped distal end wall at the second end of the body, wherein the dome-shaped distal end wall is convexly curved to extend across an opening in the cylinder head to which the combustion chamber pre-chamber device is engaged, wherein the dome-shaped distal end wall includes a first curved portion that extends into a combustion chamber of a cylinder of the internal combustion engine with the body engaged to the cylinder head, wherein the dome-shaped distal end wall includes a second curved portion that extends from the first curved portion above the combustion chamber, and
an elongated adapter at least partly located in the cylinder head, wherein the adapter includes a bore for receiving the spark plug, the adapter including a distal end portion that is engaged to a proximal end portion of the body of the combustion pre-chamber device, wherein one of the distal end portion of the adapter and the proximal end portion of the body of the combustion pre-chamber device is received in the other of the distal end portion of the adapter and the proximal end portion of the body of the combustion pre-chamber device.

27. The apparatus of claim 26, wherein one of the distal end portion of the adapter and the proximal end portion of the body of the combustion pre-chamber device includes a circumferential groove for receiving the other of the distal end portion of the adapter and the proximal end portion of the body of the combustion pre-chamber device.

* * * * *